UNITED STATES PATENT OFFICE.

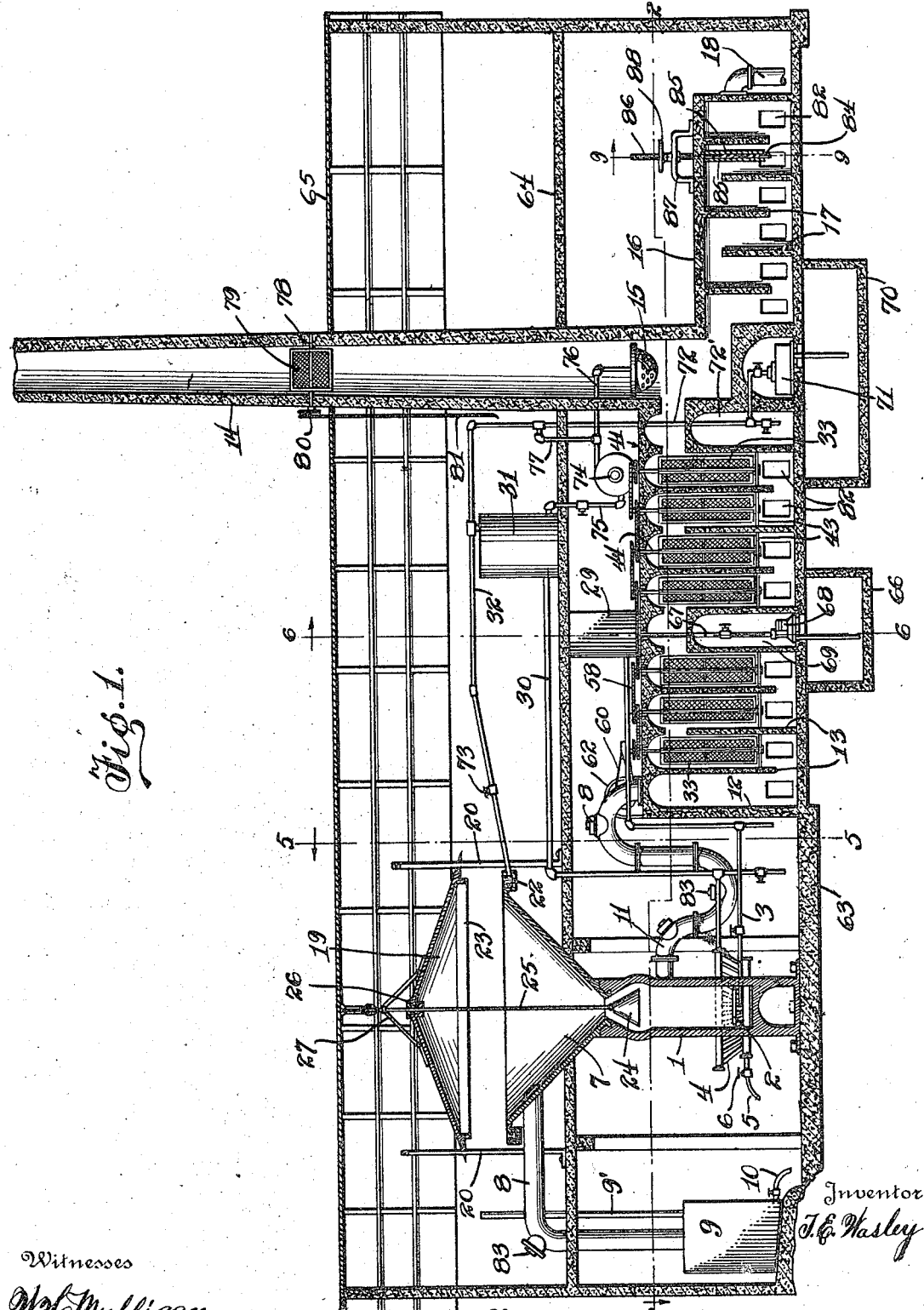

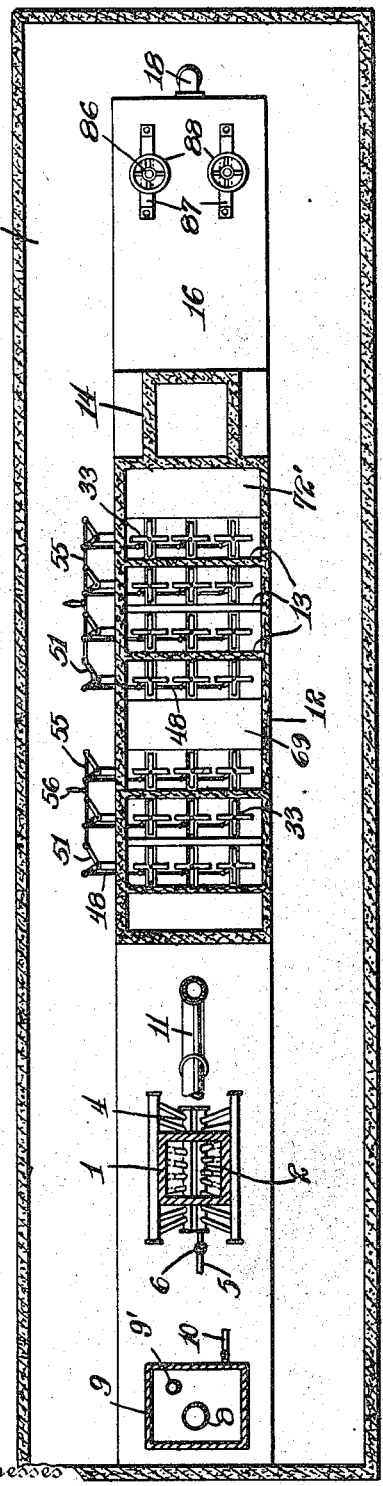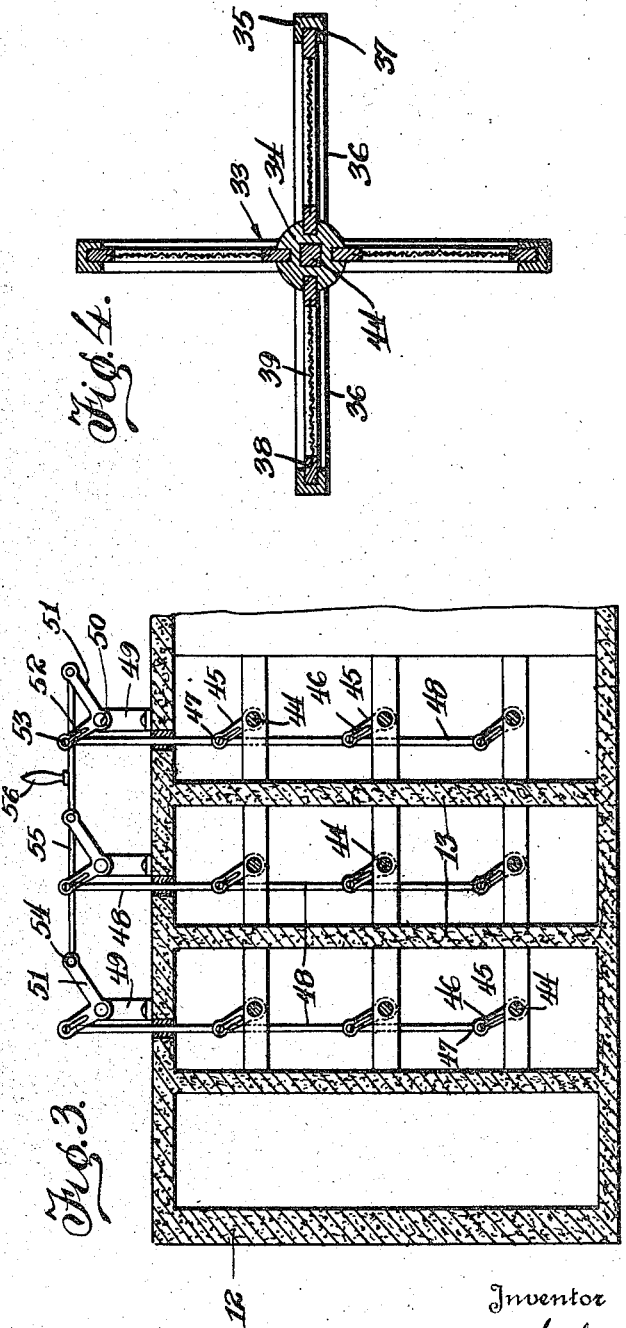

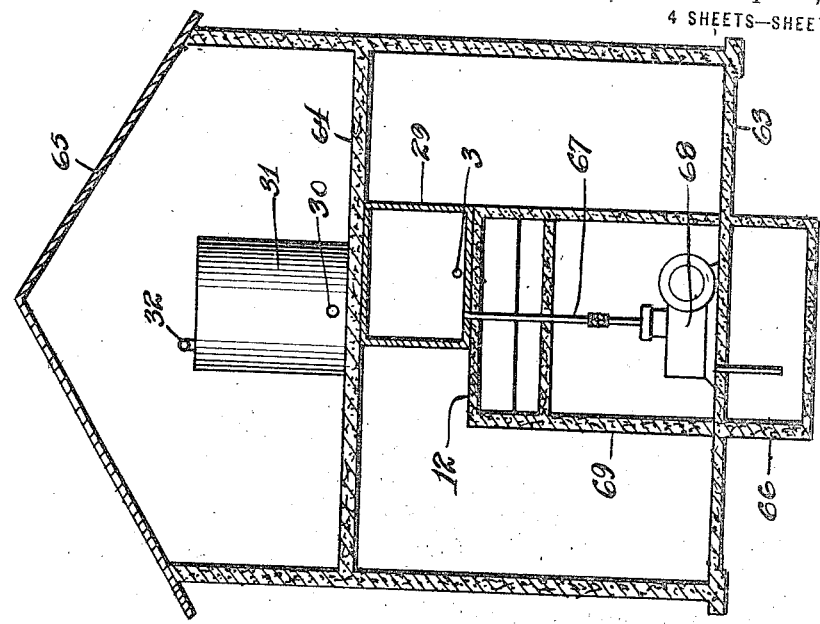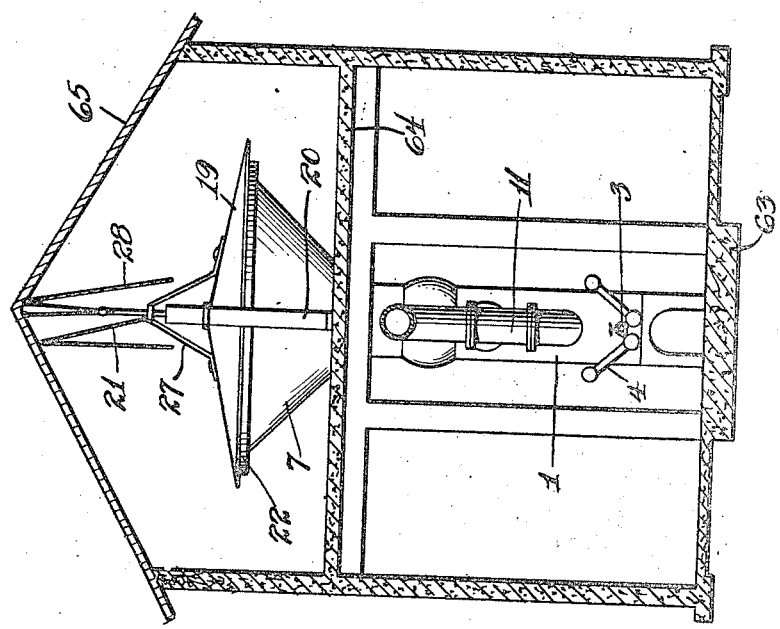

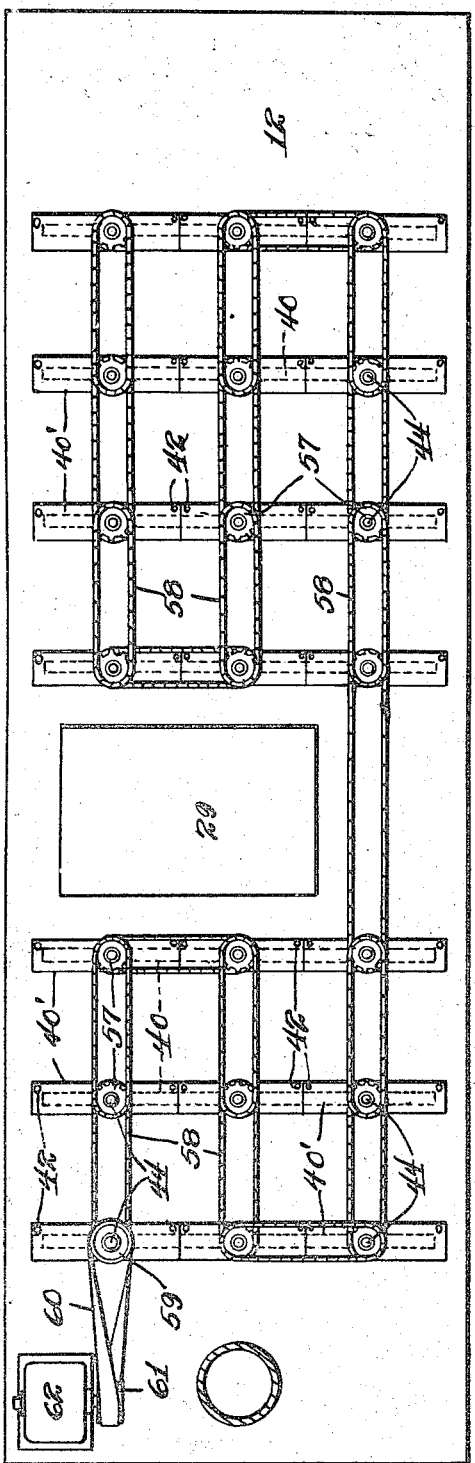
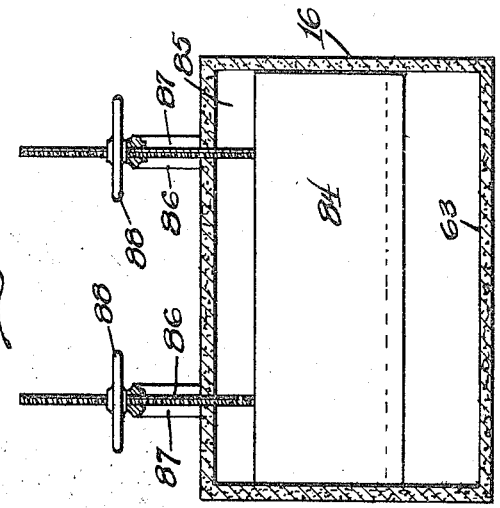
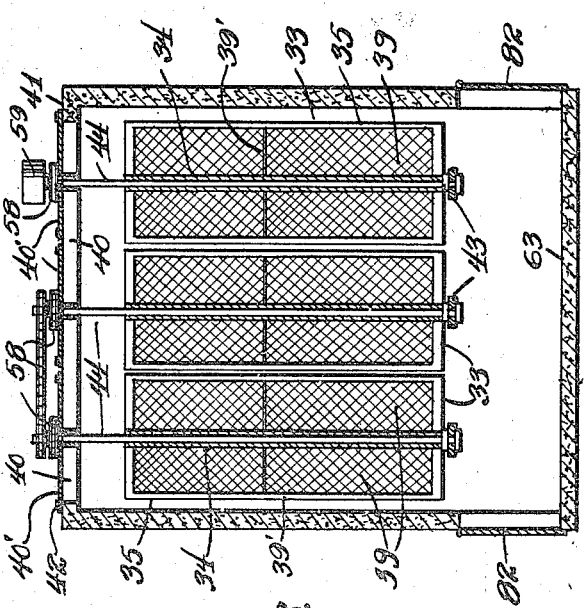

THOMAS E. WASLEY, OF SPRINGFIELD, MISSOURI.

INCINERATING PLANT.

1,178,365.  Specification of Letters Patent.  Patented Apr. 4, 1916.

Application filed February 12, 1914. Serial No. 818,362.

*To all whom it may concern:*

Be it known that I, THOMAS E. WASLEY, a citizen of the United States, residing at Springfield, in the county of Greene and State of Missouri, have invented certain new and useful Improvements in Incinerating Plants, of which the following is a specification.

My invention relates to an improved incinerating plant or apparatus.

The main object of the invention is to provide a generally improved plant or apparatus of the type set forth in Letters Patent of the United States, for an improved apparatus for incinerating refuse material, No. 1,094,503, issued to me on April 28, 1914; the plant or apparatus being improved particularly with respect to the provision of novel removable, turnable screens within the main condenser for the products of combustion, of a more effective form of cover for the drying hopper or chamber, of a valve or closure controlling communication between the drying chamber and furnace of such construction as not to readily warp or be injuriously affected by intense heat, of means whereby the collecting chamber for solid matter may be closed in the event of stoppage or injury to its drain pipe, so that the operation of the plant will not be affected, and of means to render the interior of the conductors, collecting chambers or condensers and pump chambers accessible to facilitate operation, inspection and cleaning.

With the foregoing and other objects in view such as will appear hereinafter as the description progresses, the invention has been embodied in preferable form in the device shown in the accompanying drawings.

In said drawings: Figure 1 is a vertical longitudinal sectional view of the apparatus; Fig. 2 is a horizontal longitudinal sectional view of the apparatus taken on the line 2—2 of Fig. 1; Fig. 3 is an enlarged fragmentary horizontal sectional view of the main condenser specifically illustrating the means whereby the screens employed may be manually operated; Fig. 4 is a transverse sectional view of one of the screen devices employed; Fig. 5 is a vertical sectional view on the line 5—5 of Fig. 1; Fig. 6 is a vertical sectional view on the line 6—6 of Fig. 1; Fig. 7 is a plan view of the main condenser showing the power means for operating the screen devices; Fig. 8 is an enlarged vertical sectional view through the condenser, and Fig. 9 is a sectional view on the line 9—9 of Fig. 1.

Throughout the various views of the drawings, like reference characters designate like or similar parts.

Referring to the drawings, 1 designates an incinerator chamber in which combustion is supported by a burner 2 therein to which leads an oil feed pipe 3. A waterback 4 is associated with the incinerator chamber and hot water therefrom is used at the plant for sanitary purposes, it being led off through a nipple 5 controlled by a valve 6. Supported on and directly over the chamber 1 is a drying chamber or hopper 7 from which leads a distillate conductor pipe 8 to a collecting chamber or condenser 9 for the distillate or volatile products. Such products as may settle in this chamber 9 are drawn off through a valve-controlled faucet or nipple 10. From the chamber 1 at its upper end leads a conductor pipe for products of combustion, the pipe being designated 11 and leading to a condenser chamber 12 for the products of combustion, the chamber having any desired number of staggered walls 13, in order that the products of combustion will follow a tortuous path through the condenser. At the outlet, the condenser 12 leads to a stack 14, in the entrance end of which stack is located a nozzle which projects a spray of water downwardly against the products of combustion, thoroughly washing the gases before they escape through the stack. Such nozzle or spray is shown at 15. The lower end of the stack 14 communicates with a settling chamber or condenser 16 for the sprayed water and the particles in suspension therein. This settling chamber 16 is provided with a plurality of staggered baffle walls 17 and with a pipe 18 through which the settled products in the chamber 16 may be removed.

The parts just described are the equivalent of and practically the same as those of the same terms used in my Patent No. 1,094,503, referred to. Other equivalent parts are, of course, employed to render the apparatus complete and additional parts are also employed, and such latter equivalent and additional parts will now be described. The cover for the hopper 7 is designated 19, and provided with a plurality of notches through which extend guide brackets 20. This hopper is adapted to be moved in a vertical plane, guided by the brackets, and the means employed for raising and lowering the hopper may be a suitable cable 21, preferably power actuated, in any suitable manner. The hopper 7 is provided with a channel 22 which receives a liquid, preferably water, into which liquid extends an annular depending flange 23 of the cover 19, when the cover is in closed relation to the hopper, so that the flange 23 in combination with the water in the channel 22 will provide an effective water seal for the hopper. The bottom closure for the hopper 7 is in this instance in the form of a bell-valve 24, or the valve being specifically hollow and frusto-conical. This valve is carried by a vertically movable rod 25 slidably mounted through a stuffing box 26 of the cover 19 and through a suitable bracket 27 mounted on said cover. To the rod 25 may be fastened a cable 28 adapted to be power actuated in order to raise and lower the valve 24. The pipe 3 leads from an oil supply tank designated 29 and mounted directly on the upper wall of the condenser 13. Water is supplied to the water-back 4 through a pipe 30 which leads from a water supply tank 31. Water to the channel 22 is supplied by means of a pipe 32. These parts now described, it will be realized, complete an incinerator plant and one substantially as disclosed in my allowed application referred to, this described plant, at the same time, embodying improvements with respect to the cover for the drying chamber and closure valve therefor.

The additional improvements will now be described: Within the condenser 12, intermediate the baffle walls 13 thereof, are suitably mounted screen devices generally designated 33. These screen devices are shown in Fig. 8 as mounted three in a row. Each screen device consists of a frame in cross section shaped after a cross and having a hub 34 and side rails 35. The latter being suitably connected to the hub 34 as by means of transverse rails 36. The hub 34 and rails 35 are provided with grooves extending longitudinally thereof and designated 37. In the grooves 37 are slidably mounted rails 38 of movable screens. These screens have screen material or wire gauze 39 which is fastened to the rails 38. These screens are removable from the frame comprising the hub 34 and rails 35 and 36 by vertical movement upwardly, being adapted to be raised through openings 40 provided in the top wall 41 of the condenser 12. The screens 38—39 have two vertically alined sections pivoted together at 39' so that when removed, the screens may flex intermediate their ends so that the distance between the wall 41 and floor 64 need not be equal to the length of the screens to permit their removal. The condenser 12 should be airtight and to this end the openings 40 are closed by suitable doors or plates, the latter being pivoted as at 42 for lateral movement to clear the openings 40 when the screens are removed. Extending longitudinally of the condenser chamber 12 between the baffle walls 13 thereof and fastened thereto are bearing bars 43 in which, and also in the top wall 41 of the condenser are turnably mounted cylindrical portions of a shaft 44. On the shaft 44 the frames for supporting the screens 38—39 are fastened. The screen devices are adapted to be rotated or oscillated continuously or at times in order to remove the soot deposit from the products of combustion passing through the condenser.

In some sizes of plants, it will be practical to shake or oscillate the screen devices by hand and such a mechanism as will accomplish this result is shown in Figs. 2 and 3 of the drawings. Referring to said figures, the shafts 44 have rigidly fastened thereto crank arms 45 which are provided with elongated slots 46, through which pass set-screws 47 removably screwed into slidable rods 48 which extend through and beyond the side walls of the condenser. To the exterior of said side walls are fastened brackets 49 and pivoted thereto at 50 are bell-crank levers 51, one arm of each of which is provided with an elongated slot 52 through which passes a set-screw 53 removably fastened to the rods 48. The other arm of the bell-crank lever 51 is fastened by pivots 54 to an operating rod 55 having thereon an operating handle 56. It will be realized that when the rod 55 is actuated by manual engagement with the handle 56, the bell-cranks will cause the rods 48 to turn and accordingly turn and shake the screen devices. If it is not desired to use this described means for manually shaking the screens, the set-screws 47 and 53 can be unscrewed and together with the rods 48 removed from operative position.

In large plants it will be necessary to operate the screens by power means and such a means is shown in Figs. 1, 7 and 8. To this end each shaft 44 has keyed or otherwise fastened thereto sprocket wheels 57, over which pass sprocket chains 58. One of the shafts 44, however, has merely a single sprocket wheel 57 thereon, but in addition has mounted thereon a pulley 59. This pulley 59 is engaged by a belt 60 driven from a pulley 61 on the main shaft of a suitable motor 62. Upon the motor 62 operating, its motion will be imparted by means of the belt 60 and pulleys 61 and 59 to the latter of the shafts 44. Motion of this shaft through the medium of the sprocket wheels and sprocket chains will be imparted to the other shafts and accordingly the screen devices thereon will be simultaneously rotated.

The building structure and condensers 12 and 16 and the stack 14 are constructed preferably from concrete, the structure having a first floor 63 and a second floor 64. On the second floor 64 rests the water supply tank 31 and from this floor the material to be incinerated is fed to the hopper 7. A suitable roof 65 is provided. It will be realized that the floors 63 and 64 and roof 65 and end and side walls of the building structure in effect provide two large rooms, the upper of which is utilized principally for supplying the material to the hopper 7, and the other of which is utilized for the purpose of incinerating and treating the material.

The oil fuel is supplied to the tank 29 from an oil reservoir 66 located below the floor 63 and forming parts of the building structure proper, through a pipe 67 in connection with a pump 68. The pump proper is mounted in a man-hole or chamber 69 of the building proper. A water reservoir 70 is also provided below the floor 63 and is part of the building structure, water being pumped by a pump 71, from this reservoir 70 through a pipe 72 leading to the tank 31 and of which pipe 72, pipe 32 forms a continuation. A man-hole 72' into which pipe 72 extends, permits access to the pump and associated parts. The passage of water through the pipe 32, however, is cut off when desired through the manipulation of a valve 73. By means of a pump 74 and pipes 75 and 76, water is supplied to the nozzle 15 under pressure for effective spraying. If desired, the water could be conducted directly from the pipe 72 through a pipe 77, but it is desirable to have the water pass through the pump 74, in order that the pressure may be increased and the spray thereby more effective.

In the stack 14 at a suitable height, is turnably mounted by a rod 78, a screen 79 normally adapted to lie in a horizontal plane so that the smoke passing through the stack will pass through the screening or gauze of the screen. A crank 80 is fastened to the rod 78 and pivoted to the crank is an actuating rod 81. At suitable times the rod 81 may be actuated to shake the screen 79 to remove any deposits therefrom.

For the purpose of permitting the removal of material precipitated in the condenser 12, and condenser 16, suitable doors 82 are provided. Likewise to permit cleaning of the conductors 8 and 11, removable plugs or their equivalents 83 are provided. Means are provided whereby the escape of settled material from the tank 16 may be prevented in the event that the pipe 18 becomes clogged or is injured, without stopping the operation of the plant. To this end a vertically slidable valve 84 is mounted between two guide plates 85 within the condenser 16. Rising from the valve 84 are screw-rods 86 which pass loosely through openings in brackets 87. Manually turnable nuts in the nature of hand-wheels 88 are adapted to ride on the screw threads of rods 86 above the brackets 87 and to rest directly on said brackets. According to the adjustment of the wheels 88, the position of the valve 84 is regulated. If it is desired to close the chamber 16 against the escape of settled material, it is merely necessary to turn the hand wheels 88 in such direction as will permit the valve 84 to lower and have its lower edge engaged with the floor of the tank. The valve 84 in this position, in combination with the guide walls 85, forms a closed wall or barrier.

Particular attention is called to the fact that the fuel supply tank 29 is mounted directly on the top wall 41 of the condenser 12. Thus heat from the condenser 12 so acts on the liquid oil within the tank 29 as to convert it to some extent to a vapor or gas, so that the fuel will readily flow through the pipe 3 and be readily combustible. To this end the tank 29 functions as a retort.

In operation the fuel flowing through the burner 2 is ignited, being fed through the pipe 3 from the supply tank or retort 29. With the valve 24 closed against its tapered seat, refuse material, for instance, garbage, is fed into the hopper 7, the means for feeding the material, of course, being immaterial so far as the principle of the invention is concerned. When the channel 22 is filled with water through the pipe 32, and the hopper 7 has been filled, the cover 19 is lowered so that the flange 23 enters the water in the channel 22 and in combination with the water forms an effective water seal. The heat from the burner 2, inasmuch as the hollow bell-valve 24 is directly over the burner, heats the valve to such an extent that the contents of the hopper 7 are thoroughly dried, the distillate or volatile products being driven off through such heating, passing through the pipe 8 into the settling chamber 9 and condensing therein, assisted by air drawn in through pipe 9'. The products may be withdrawn from tank 9 when desired through the spigots 10. When the material in the hopper 7 has thoroughly dried, the rod 25 and bell-valve 24 are lowered in order to uncover the valve seat and thereupon the dried material falls from the hopper into the incinerator 1 onto the burner 2. The heat from the burner 2 thoroughly burns or incinerates the previously dried material, the products of combustion escaping or passing from the incinerator 1 through the conductor 11 into the condenser 12. Such products of combustion are acted on by the staggered baffle walls 13 and by the screens 33, so that the solid particles are precipitated out, the screens being revolved or oscillated to assist such precipitation, if desired. Precipitates in the condenser 12 may be removed through the provision of doors 82 therein. The products of combustion after passing through the condenser 12, are subjected to the action of water under pressure sprayed through the nozzle 15. This water serves to precipitate out any remaining solid particles and also to thoroughly wash the gases before escape through the stack 14. It will be realized that the washed gases before escape pass through the screen 79 which serves to break up the gases and to precipitate out any possible solid matter not previously removed, so that the remainder of the products escaping through the stack 14 will not contain solid matter nor have an obnoxious odor. As to the water sprayed through the sprayer 15 and the solid particles contained in suspension therein, this flows into the settling chamber 16 and may be drawn off through the pipe 18. If access to the interior of this settling chamber 16 is desired, the same may be had through the medium of the doors 82 thereof. In the event that the pipe 18 becomes clogged or needs repairs, the hand-wheels 88 may be adjusted so that the lower edge of the gate-valve 84 will be lowered into contiguous relation with the floor 63 and in combination with the sides 85, prevent the escape of the liquid through this chamber. It will thus be realized that should the pipe 18 be clogged, it is not necessary to cease operation of the plant while a difficulty is overcome.

It is to be understood that the device described and illustrated merely forms my present embodiment, in view of which fact, changes in the details may be made and are reserved provided they fall within the spirit and scope of the appended claims.

Having thus described my invention what I claim as new and desire to secure by Letters Patent is:

1. An incinerating plant having an incinerator, a condenser in communication with said incinerator, removable means within the condenser to treat products of combustion passing thereinto, in combination with a portion of the plant structure disposed adjacent the condenser and preventing removal of the said means as a rigid structure, said condenser having an opening in a wall thereof through which said means is removable, and said means having a plurality of relatively movable sections to facilitate its removal.

2. An incinerating plant including an incinerator, a condenser in communication with said incinerator, a screen device mounted in said condenser having a removable screen disposed vertically, the top of said condenser being provided with an opening through which said screen may be removed, floors above said top at a distance less than the length of the screen, said screen device comprising a plurality of flexibly connected sections to permit removal through said opening, and means to normally close said opening.

3. An incinerating plant including an incinerator, a condenser in communication with said incinerator, a stack leading from said condenser, a water tank, a supply pipe for said tank, a pump to supply water from a source of supply through said pipe, means to spray water into the products of combustion prior to escape from the stack, a pipe leading from said tank to said spray means, a pipe communicating with both of said pipes, and a pump to increase the rate of flow of water through the second mentioned pipe.

4. An incinerating plant including a structure having first and second floors, an incinerator on said first floor, a drying chamber for said incinerator arranged to receive material above said second floor, a cover for said drying chamber, means to provide a water seal for said cover, a condenser built from said first floor communicating with said incinerator, a stack leading from said condenser, a spray device adjacent the entrance of said stack, a water supply tank, a water reservoir, means to pump and supply water to said water tank and spray device, and a second pump to increase the pressure of water passing through said spray device.

5. An incinerating plant, including a structure having first and second floors, an incinerator mounted on said first floor, a drying chamber disposed over said incinerator to receive material above said second floor, a closure member to normally close communication between the drying chamber and incinerator, means to conduct distillate from said drying chamber, a cover member for said drying chamber, water seal means for said cover, a condenser built from said first floor, a conductor leading from said incinerator to said condenser, an oil reservoir below said first floor, a chamber within said condenser, a pump within said chamber operated in connection with said reservoir, a pipe leading from said pump to said tank, a burner within said incinerator, a pipe to supply fuel from said tank to said burner, baffle walls in said condenser, screens in said condenser, means operable to shift said screens for the purpose specified, a water reservoir below said first floor, a chamber substantially within said condenser, a pump within said latter chamber operating in connection with said latter reservoir, a water supply tank, a stack leading from the condenser, a spray device adjacent the entrance to said stack, pipe means to supply water passing through said pump to said water seal, tank and said spray, a pump to increase the pressure of water passing through said spray, a settling chamber for the sprayed water and products in suspension therein, said settling chamber being built from said first floor.

In testimony whereof I affix my signature in presence of two witnesses.

THOMAS E. WASLEY.

Witnesses:
M. E. JONES, Jr.,
S. WHITE.